United States Patent
Cho et al.

(10) Patent No.: US 8,374,171 B2
(45) Date of Patent: Feb. 12, 2013

(54) METHOD FOR REDUCING THE RISK OF CALL CONNECTION FAILURE AND SYSTEM TO PERFORM THE METHOD

(75) Inventors: HyunDeuk Cho, Yongin-si (KR); Ohyoon Kwon, Seoul (KR); Tae Han Lee, Suwon-si (KR)

(73) Assignee: Pantech Co., Ltd., Seoul (KR)

( * ) Notice: Subject to any disclaimer, the term of this patent is extended or adjusted under 35 U.S.C. 154(b) by 1014 days.

(21) Appl. No.: 12/398,631

(22) Filed: Mar. 5, 2009

(65) Prior Publication Data
US 2009/0225684 A1 Sep. 10, 2009

(30) Foreign Application Priority Data

Mar. 6, 2008 (KR) .................. 10-2008-0021168
Jan. 22, 2009 (KR) .................. 10-2009-0005486

(51) Int. Cl.
*H04L 12/66* (2006.01)
(52) U.S. Cl. ........................ 370/352; 370/401
(58) Field of Classification Search .............. None
See application file for complete search history.

(56) References Cited

U.S. PATENT DOCUMENTS

| | | | | |
|---|---|---|---|---|
| 7,139,279 B2 * | 11/2006 | Jabri et al. | ............ | 370/410 |
| 7,388,873 B2 * | 6/2008 | Jabri et al. | ............ | 370/410 |
| 7,483,441 B2 * | 1/2009 | Jabri et al. | ............ | 370/410 |
| 7,675,948 B2 * | 3/2010 | Malomsoky et al. | ......... | 370/536 |
| 7,688,837 B2 * | 3/2010 | Jabri et al. | ............ | 370/410 |
| 7,839,804 B2 * | 11/2010 | Abrol et al. | ............ | 370/261 |
| 7,920,493 B2 * | 4/2011 | Jabri et al. | ............ | 370/310 |
| 8,009,686 B2 * | 8/2011 | Jabri et al. | ............ | 370/410 |
| 8,036,234 B2 * | 10/2011 | Belling et al. | ............ | 370/401 |
| 2007/0201484 A1 * | 8/2007 | Kenrick et al. | ............ | 370/395.5 |
| 2007/0291776 A1 * | 12/2007 | Kenrick et al. | ............ | 370/401 |

* cited by examiner

*Primary Examiner* — Gregory Sefcheck
(74) *Attorney, Agent, or Firm* — H.C. Park & Associates, PLC

(57) ABSTRACT

A method for reducing a risk of a call connection failure in a video communication providing a multimedia ring back tone service includes replying to a call connection request from a calling terminal, receiving a first message, determining whether the first message includes predetermined data and if the first message includes the predetermined data, setting a second message from the calling terminal as an initial value for a Numbered Simple Retransmission Protocol (NSRP) session with the calling terminal. The predetermined data may include a video temporal spatial tradeoff command, miscellaneous video temporal spatial indication, or a video fast update picture command. A system to perform the method includes a receiving unit, a determination unit, and a setting unit.

13 Claims, 3 Drawing Sheets

METHOD FOR REDUCING THE RISK OF CALL CONNECTION FAILURE AND SYSTEM TO PERFORM THE METHOD

CROSS-REFERENCE TO RELATED APPLICATIONS

This application claims priority from and the benefit of Korean Patent Application No. 10-2008-0021168, filed on Mar. 6, 2008, and Korean Patent Application No. 10-2009-0005486, filed on Jan. 22, 2009, which are hereby incorporated by reference for all purposes as if fully set forth herein.

BACKGROUND OF THE INVENTION

1. Field of the Invention

The present invention relates to a method for reducing the risk of a call connection failure, and a system to perform the method.

2. Discussion of the Background

A variety of wireless communication services using a wireless network are available due to the development of computer and communication technologies. A basic wireless communication service may be a wireless voice call service that permits mobile terminal users to make a wireless voice call anytime and anywhere. Accordingly, a mobile communication service subscriber may speak to another user anytime and anywhere, including while moving, using a wireless voice call service.

H.324 is an International Telecommunication Union (ITU) protocol standard for multimedia communication over generalized switched telephone networks (GSTN). H.324M is an extension of H.324 for operations over mobile networks, and 3G-324M is a recommendation by the third generation partnership program (3GPP) defining an adaptation of H.324M for use within 3GPP and also adopted by 3GPP2. "H.324-like" equipment includes devices and systems employing protocols based on or derived from H.324. H.324-like equipment can connect to other H.324-like equipment via switching centers and to non-H.324-like equipment through multimedia gateways.

When a call is made between equipment using H.324, H.324M or 3G-324M, the first stage of the call is to establish an end-to-end bearer between the equipment. This stage is called 'Call Signaling' and is outside the scope of H.324, except where modems and the GSTN are used. The second stage of the call is to establish the H.324 session, to provide a way of transporting video, audio, and/or data between the equipment in a format that is known to and supported by the equipment. In order to accomplish this, H.324M makes use of two ITU-T Recommendations.

The first Recommendation is H.223 "Multiplexing protocol for low bit rate multimedia communication". H.223 specifies a frame-oriented multiplexing protocol that allows the transfer of any combination of digital voice, video, and data (e.g. command and control) information over a single communication link. The H.223 may have a number of modes of operation, specified in Annexes A, B and C of the H.223 Recommendation, that are intended to provide increased resilience in the presence of errors. These modes of operation are also known as Mobile Levels 1, 2, and 3. H.223 without the application of any of these Annexes is also sometimes referred to as operating at Mobile Level 0 (base-line). H.324 includes the concept of Logical Channels, which is a way of providing virtual channels over the circuit switched link. The role of the multiplexer is to combine (multiplex) parts of the data chunks written on the logical channels into frames known as a Multiplexer Protocol Data Unit (MUX-PDU). Logical Channel 0 is used for Command and Control. Data (voice, video, command and control and other general data) is passed to/from the H.223 multiplexer through bitstream chunks called service data units (SDUs). Before being multiplexed, these different SDUs go through Adaptation Layers where extra information may be added for purposes such as error detection, sequence numbering, and/or retransmission requests.

The second Recommendation is H.245 "Control protocol for multimedia communication," which specifies the syntax and semantics of terminal information messages as well as procedures to use the messages for in-band negotiation at the start of or during communication. The messages cover receiving and transmitting capabilities and preferences, logical channel signaling and control and indication. The messages that are specified in H.245 are expressed in the ITU-T Abstract Syntax Notation (ASN.1) and can be classified as request, response, command, or indication type. H.245 messages are encoded according to the ASN.1 standard before being transmitted. If a sending terminal sends an H.245 message of type "request" to a target terminal, the target terminal should send an appropriate message of type "response" in response. If the response (sometimes referred to as an Ack for Acknowledgement) is not received within a certain time, the sending terminal may re-transmit the request, or may take other appropriate action if no response has been received for repeated requests. Re-transmission of requests may occur a number of times. Many of the H.245 messages associated with call set up are of the "request" type.

H.245 also includes a reliable link layer for proper operation. The principal way of providing the reliable link layer, specified in annex A of H.324, is to use the Simple Retransmission Protocol (SRP) or the Numbered Simple Retransmission Protocol (NSRP), in which one or more H.245 messages, known collectively as a MultimediaSystemControl PDU and in the present document as an H.245 PDU, are formed into SRP Command Frames prior to sending, and the receiving terminal sends an SRP response frame (sometimes referred to as an SRP Ack) to acknowledge correct receipt of each SRP command frame. No further H.245 messages are usually sent by a terminal until the SRP Ack for the last message has been received.

Because an H.245 Response message is sent for each H.245 request message received, and because an SRP Ack is received for every SRP command frame sent, a single H.245 request message may take some time to be conveyed successfully. The H.324 standard allows for multiple H.245 messages to be concatenated into a single SRP command frame. However, this capability is often not implemented, in which case a receiving or called terminal may respond only to the first H.245 message encountered in an SRP command frame. In some cases, terminals that do not support this capability may malfunction upon receiving an SDU containing multiple H.245 requests or responses.

The steps involved in setting up and connecting a typical H.324 call include:

1. Call signaling (bearer establishment). This may be achieved by a modem connection in the case of GSTN, through ISDN, or signaling through mobile switching centers in the mobile case.

2. Mobile level detection (MLD). In this step, a common Mobile Level is agreed on between equipments. This step is performed by H.324 equipment that supports mobile extensions such as H.324M and 3G-324M equipment.

3. Terminal Capability Exchange (TCS)

4. Master Slave determination (MSD)

5. Open/Close Logical Channels (OLC)

6. Multiplexer Table Entries Exchange (MTE)

Steps (3) to (6) are performed using H.245 Messaging, and more specifically, a sequence of H.245 request and response messages as described above.

Further, steps (3) to (6) relate to procedures that are defined by underlying state machines known as Signaling Entities. The relevant signaling entities are:

1. Capability Exchange Signaling Entity (CESE)
2. Master Slave Determination Signaling Entity (MSDSE)
3. Logical Channel Signaling Entity (LCSE)
4. Multiplex Table Signaling Entity (MTSE)

Once these steps have been completed, media (video, audio, and/or data) can flow between the terminals. The H.245 messages flow on the Logical Channel 0, which as previously described is predefined and carried by the multiplexer predefined Multiplex Table Entry 0. Once other Multiplex Table Entries have been exchanged, these can also be used in conjunction with H.245 messages.

The steps above are often handled sequentially. However, this may result in as many as ten H.245 message round trips, including delays, to establish an H.324 session with two logical channels in each direction. In addition, the SRP scheme (or Numbered version—NSRP, if the mobile level is greater than zero) used for H.324/H.245, in which an SRP message is received by the endpoint for every message sent, prior to sending any other message, regardless of whether it is associated with the same Signaling Entity or not, further limits the scope to pipeline messages on the network, and further slows call set up.

For H.324M, the Terminal Capabilities Set request (TCS) step described above is preceded by a mobile level detection/multiplexer synchronization phase. This includes each terminal transmitting a repeating pattern of bits (flags) that indicate the highest mobile level at which the terminal operates. Each terminal examines the flags that it is receiving. If a received flag represent a lower mobile level than the mobile level of the receiving terminal, the terminal drops down to the same lower level. When both terminals are transmitting the same flag sequence this step can be completed.

Arising from the set of procedures described above to establish an H.324M call, when a call is made from a terminal using H.324, a long call set up time may occur. Call set up time is the interval beginning when the call signaling is initiated to the time that the exchange of voice and video commences between an H324-like end-point (H.324, H.324M or 3G-324M) and another terminal, whether H.324-like or not.

The ITU Recommendation H.323 uses H.245 in a similar manner to H.324 for signaling command, control, and indication messages related to a call. Unlike H.324, H.323 is equipped with a number of features to increase the call set up time between H.323 equipment. Similar techniques exist for the IETF Session Initiation Protocol (SIP) protocol.

Thus, there exists a need for techniques to speed up the call set up between H.324 like terminals and other terminals (including servers) either of the H.324 type, or terminals such as H.323 via multimedia gateways that terminates the H.324 side and would have an H.324-like termination in them. The differences between the H.324 protocol (and its extensions such as H.324M and 3G-324M) and H.323 and other protocols mean that additional aspects should be considered when introducing call establishment speed-up techniques for H.324-like terminals. Such differences may include the information about mobile levels where they are used and the messaging and information related to the H.223 multiplexer such as its multiplex table entries, adaptation layers, and so on.

Currently, a ring back tone (RBT) service is the focus of attention. An RBT service enables various types of multimedia data (for example, video and voice) designated by a telephone receiver of a mobile terminal to be replayed in a mobile terminal of a caller or a general telephone. An RBT designated by a telephone receiver is provided to a caller in an RBT service. Voice data, such as new pop songs instead of a traditional mechanical RBT, as well as video data such as a picture or movie, may be used as a multimedia RBT.

If a multimedia RBT service is provided, a telephone receiver may look at or listen to a designated video or voice as opposed to a mechanical RBT, and thus listening and visual satisfaction may increase.

In a conventional video communication, a called terminal assumes that a call is connected and a video call session starts when a telephone receiver answers a phone. Actually, a call channel between an originating subscriber and a call connection video server may be established first, and then switched when a telephone receiver answers a phone.

Accordingly, a calling terminal disconnects an existing video call session and prepares a new session, and in this process a terminating subscriber may receive a message generated at the calling terminal and intended to be transmitted to a call connection video server.

If a called terminal receives such a message, the called terminal may set a sequence number of a Numbered Simple Retransmission Protocol (NSRP) layer of H.324 for handling H.245 message as an initial value. In this instance, the sequence number of the NSRP layer is an erroneously set value, and is a value used by a calling terminal in a session with an existing call connection video server. Accordingly, the called terminal may recognize a sequence number of a normal message, sent after the calling terminal closes a session with the call connection video server, as an error, and thus a video call session may fail due to timeout and the call is not connected.

SUMMARY OF THE INVENTION

This invention provides a method for reducing the risk of a call connection failure in a video communication providing a multimedia ring back tone service.

This invention also provides a system for performing the method of reducing the risk of a call connection failure in a video communication providing a multimedia ring back tone service.

Additional features of the invention will be set forth in the description which follows, and in part will be apparent from the description, or may be learned by practice of the invention This invention discloses a method for reducing a risk of call connection failure including replying to a call connection request from a calling terminal, receiving a first message, determining whether the first message includes predetermined data, the predetermined data including data to be sent to a call connection video server, and if the first message includes the predetermined data, setting a second message from the calling terminal as an initial value for a Numbered Simple Retransmission Protocol (NSRP) session with the calling terminal. This invention also discloses a computer, having a processor and an internal memory, adapted to execute a program stored on the internal memory or on a computer-readable recording medium, the program including this method for reducing a risk of call connection failure.

This invention also discloses a system to reduce a risk of call connection failure including a receiving unit to reply to a call connection request from a calling terminal and to receive a first message, a determination unit to determine whether predetermined data is included in the first message, the predetermined data including data to be sent to a call connection video server, and a setting unit to set a second message from the calling terminal as an initial value for a Numbered Simple Retransmission Protocol (NSRP) session with the calling terminal if the first message includes the predetermined data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
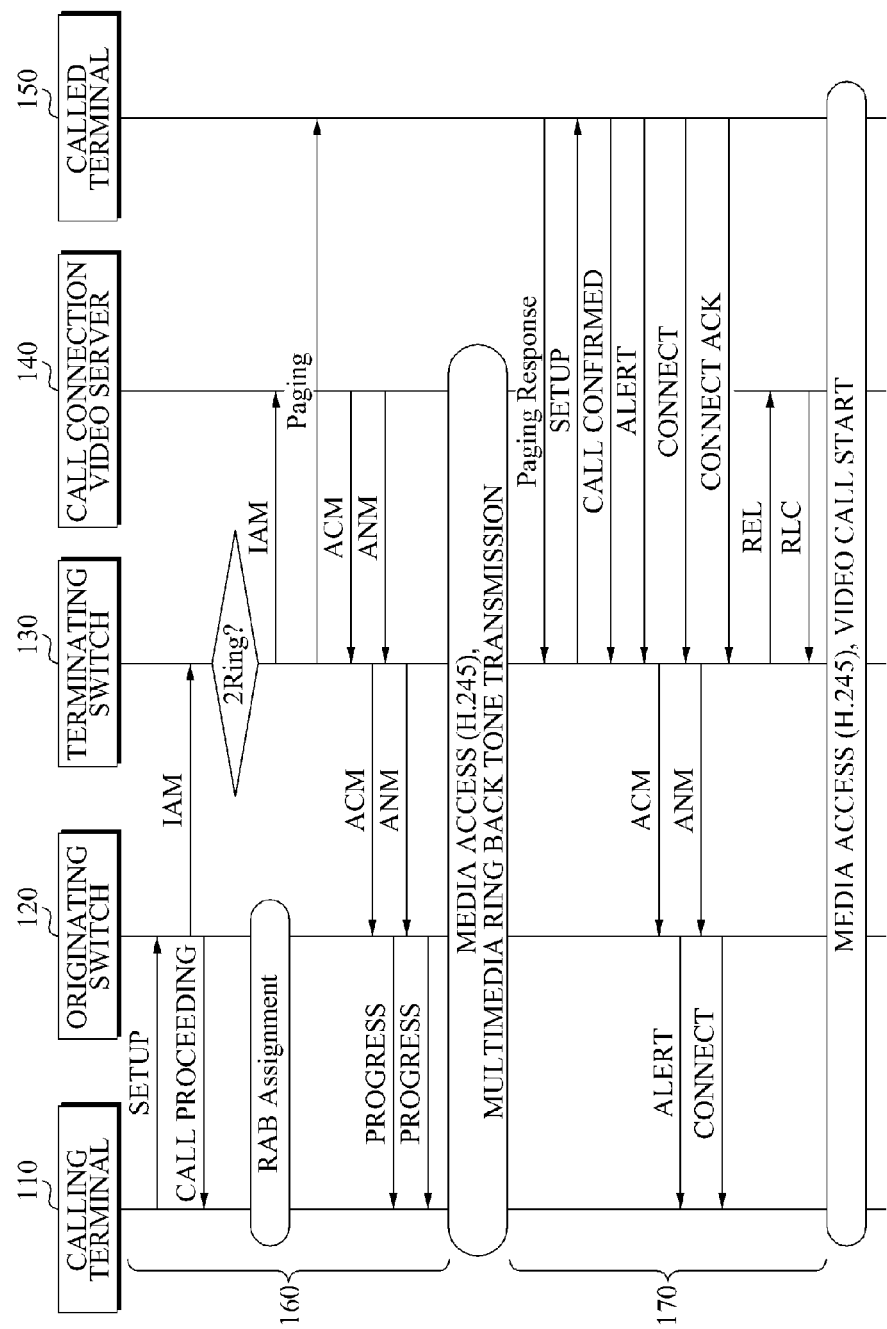
FIG. 1 is a diagram illustrating a system for reducing the risk of a call connection failure in a video communication providing a multimedia ring back tone service according to an exemplary embodiment of the present invention.

The exemplary embodiments of the invention will now be described more fully with reference to the accompanying drawings, in which exemplary embodiments of the invention are shown. This invention may, however, be embodied in many different forms and should not be construed as limited to these embodiments. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

If an element is referred to as being "connected to" another element, it can be directly connected to the other element, or intervening elements may be present. In contrast, if an element is referred to as being "directly connected to" another element, there are no intervening elements present.

FIG. 1 is a diagram illustrating a system for reducing the risk of a call connection failure in a video communication providing a multimedia ring back tone service according to an exemplary embodiment of the present invention.

Referring to FIG. 1, the system performs a multimedia RBT service in operation 160, and performs a video call connection process in operation 170. Hereinafter, operations of the system are described in more detail. The multimedia RBT service in operation 160 and the video call connection process in operation 170 may be simultaneously or substantially simultaneously performed.

In operation 160, a calling terminal 110 receives a video call request from a user of the calling terminal 110 (the user of the calling terminal 110 will be referred to as a caller). Also, the calling terminal 110 makes a call, and transmits a setup message to an originating switch 120.

The originating switch 120 receives the setup message from the calling terminal 110, and transmits a call proceeding message to the calling terminal 110. The originating switch 120 transmits an Initial Address Message (IAM) to a terminating switch 130 and makes a call connection request.

When the call connection request is made, the terminating switch 130 searches a subscriber profile such as a Home Location Register (HLR) using an identification (ID) of the calling terminal 110 or called terminal 150, and determines whether the caller or a user of the called terminal 150 (the user of the called terminal will be referred to as a telephone receiver) is a subscriber of the multimedia RBT service. The ID may be included in the received setup message.

In this instance, the terminating switch 130 may determine whether the caller is a subscriber of the multimedia RBT service using a 'Ring to me' scheme. In the 'Ring to me' scheme, the caller may read a RBT set by the caller. Also, the terminating switch 130 may determine whether the telephone receiver is a subscriber of the multimedia RBT service using a 'Ring to you' scheme. In the 'Ring to you' scheme, the caller may read a RBT set by the telephone receiver.

As a result of the determination, the terminating switch 130 may transmit the IAM to a call connection video server 140.

The call connection video server 140 receives the IAM from the terminating switch 130, and transmits an address complete message (ACM) and answer message (ANM) to the terminating switch 130 in response to the IAM. The terminating switch 130 transmits the ACM and ANM to the originating switch 120. Through this, the terminating switch 130 may connect to the call connection video server 140, open a video call session, and establish a first channel with the call connection video server 140 to provide the multimedia RBT service.

The call connection video server 140 extracts multimedia RBT data from a database by referring to a profile of the telephone receiver. Also, the call connection video server 140 provides the extracted multimedia RBT data to the terminating switch 130 through the first channel.

The terminating switch 130 receives the multimedia RBT data from the call connection video server 140, and transmits the received multimedia RBT data to the calling terminal 110. Accordingly, the caller may look at or listen to a multimedia RBT (video, voice, and the like) of the telephone receiver through the calling terminal 110.

In operation 170, when receiving a paging response from the called terminal 150 associated with the paging sent from the terminating switch 130 to the called terminal 150, the terminating switch 130 transmits a setup message to the called terminal 150. Then, the called terminal 150 transmits a call confirmed message and alert message to the terminating switch 130 in response to the setup message.

The terminating switch 130 transmits an ACM to the originating switch 120, and the originating switch 120 transmits the alert message to the calling terminal 110.

When the called terminal 150 transmits a connect message to the terminating switch 130, the terminating switch 130 transmits a connect acknowledgement (connect ack) in response to the connect message. Also, when the terminating switch 130 transmits an ANM to the originating switch 120, the originating switch 120 transmits a connect message to the calling terminal 110.

As described above, if the called terminal 150 replies to the call connection request from the calling terminal 110, that is, if the telephone receiver answers a phone call from the calling terminal 110, the terminating switch 130 transmits a release (REL) message to the call connection video server 140. Also, the call connection video server 140 transmits a release complete (RLC) message to the terminating switch 130. Accordingly, the terminating switch 130 disconnects from the call connection video server 140, switches the first channel with the call connection video server 140 to a second channel (call channel) with the called terminal 150, and thereby may permit a video call to be connected between the calling terminal 110 and the called terminal 150.

In this instance, the system analyzes a characteristic of an H.245 message when switching the channels, and thereby may reduce the risk of video call connection failure when the called terminal 150 is answered after connecting to the call connection video server 140. The H.245 message is received while disconnecting an existing video call session and preparing a new session.

Hereinafter, the system is described in more detail.

Figure 2:
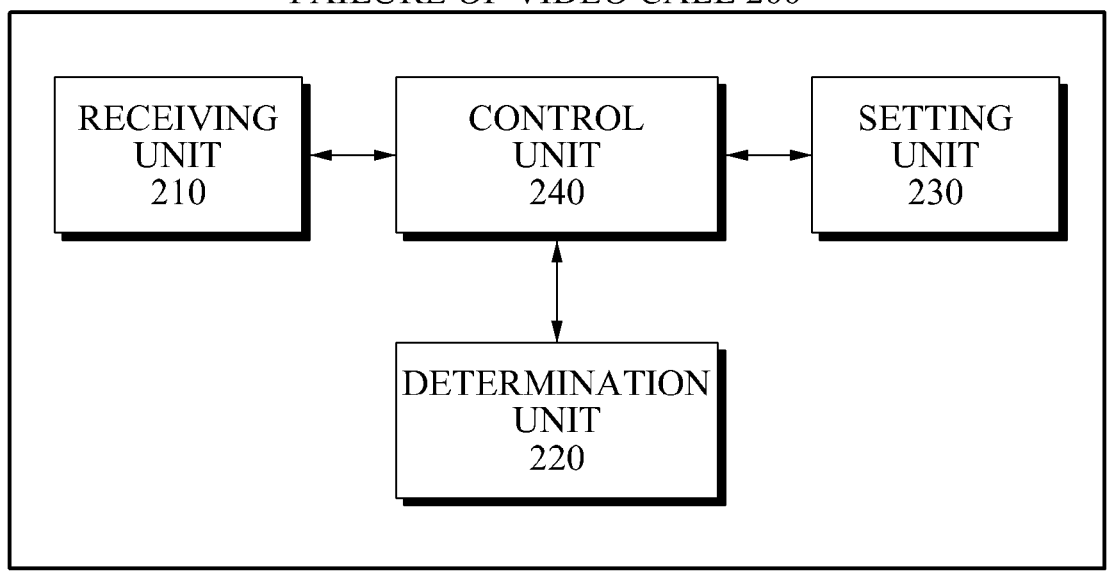
FIG. 2 is a block diagram illustrating a system for reducing the risk of a call connection failure in a video communication providing a multimedia ring back tone service according to an exemplary embodiment of the present invention.

FIG. 2 is a block diagram illustrating a system for reducing the risk of a call connection failure in a video communication providing a multimedia ring back tone service according to an exemplary embodiment of the present invention.

Referring to FIG. 2, the system 200 may include a receiving unit 210, a determination unit 220, a setting unit 230, and a control unit 240.

The receiving unit 210 replies to a call connection request from a calling terminal 110 and receives a first message from the calling terminal 110. Here, the first message may be an H.245 message. The H.245 message may be a message received while a capability exchange or a level detection between calling terminal and called terminal is performed, when opening a video call session with the calling terminal 110 and after replying to the call connection request.

In this instance, the receiving unit 210 may receive a message that was intended to be transmitted from the calling terminal to a call connection video server 140 as the first message, when a channel switch from a first channel to a second channel is performed. Accordingly, the first message is analyzed.

Also, it is determined whether the first message is a message that was intended to be transmitted to the call connection video server 140 or a message from an originating switch 120. This determination is performed in the determination unit 220, as described below.

The determination unit 220 analyzes the first message and determines whether predetermined data is included in the first message. Specifically, the determination unit 220 may determine whether the first message includes predetermined data indicating that the first message was intended to be sent to the call connection video server 140 and instead was erroneously sent to the called terminal 150. The predetermined data may include at least one of a video temporal space tradeoff command, miscellaneous video temporal spatial indication, and video fast update picture command.

If the predetermined data is included in the first message, the determination unit 220 determines whether the first message corresponds to a first received message that was received after the called terminal 150 replied to the call connection request.

If the first message corresponds to the first received message, the setting unit 230 sets a second message (H.245 message) as an initial value for a Numbered Simple Retransmission Protocol (NSRP) session with the calling terminal 110. In this instance, the second message is received after the first message.

That is, the setting unit 230 may set the second message as a sequence number of an NSRP layer. For this, the setting unit 230 may determine that the first message is a message that was intended to be transmitted to the call connection video server 140, disregard the first message, and invalidate the initial value set based on the first message.

Conversely, if the first message does not include the predetermined data, that is, it is a normal message such as a CESE_REQUEST_MSG or MSDSE_REQUEST_MSG, or does not correspond to the first received message as described above, the setting unit 230 may set the first message as the initial value for the NSRP session with the calling terminal 110. That is, if the first message is a message transmitted from the originating switch 120 as opposed to a message that was intended to be transmitted to the call connection video server 140, the setting unit 230 may set the first message as the sequence number of the NSRP layer.

The control unit 240 controls the system 200 for reducing the risk of a call connection failure in a video communication providing a multimedia RBT service. That is, the control unit 240 may control an operation of at least the receiving unit 210, the determination unit 220, and the setting unit 230.

The system 200 for reducing the risk of a call connection failure in a video communication providing a multimedia RBT service according to an exemplary embodiment of the present invention may be arranged in the called terminal 150.

Figure 3:
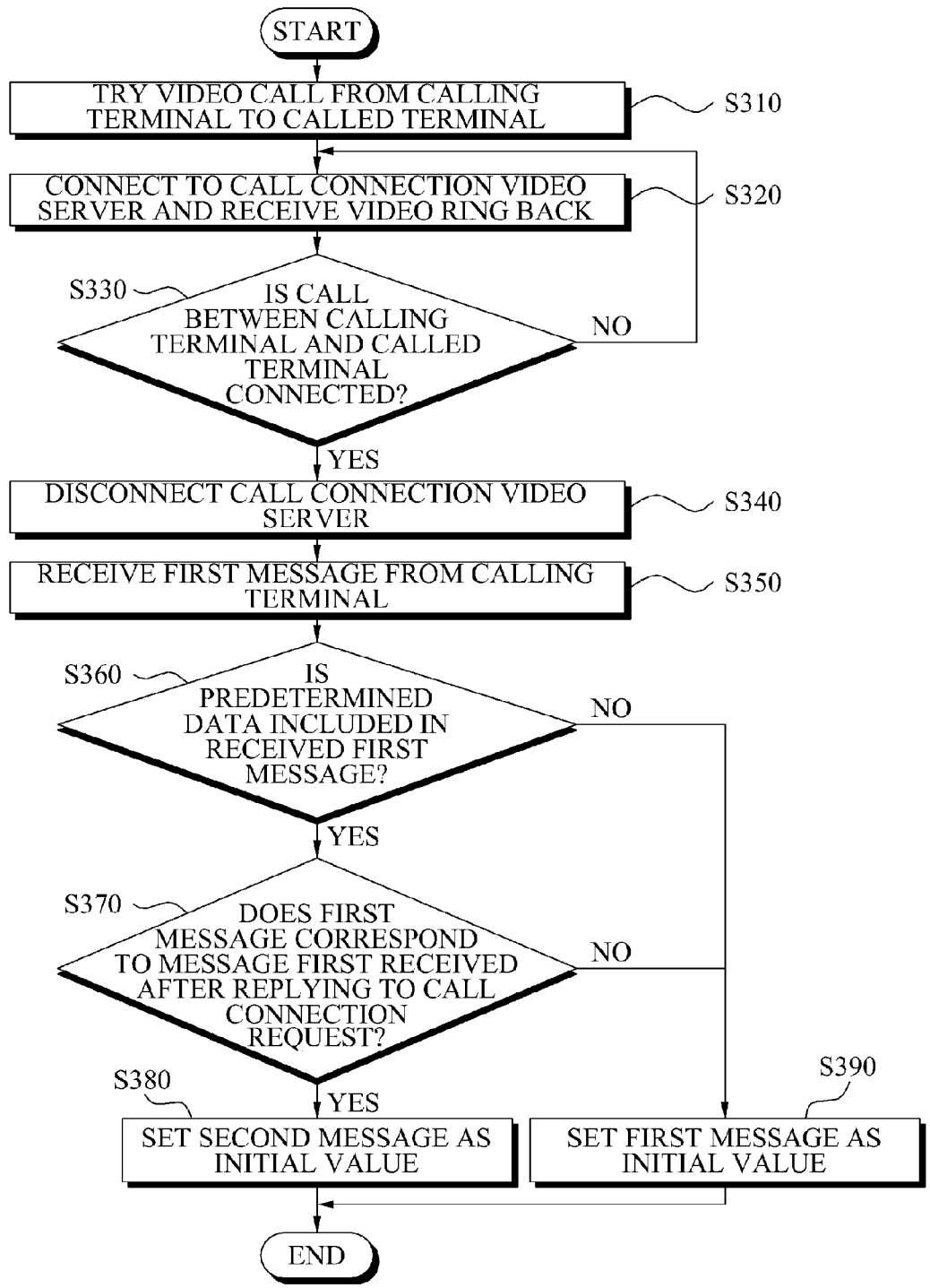
FIG. 3 is a flowchart illustrating a method for reducing the risk of a call connection failure in a video communication providing a multimedia ring back tone service according to an exemplary embodiment of the present invention.

FIG. 3 is a flowchart illustrating a method for reducing the risk of a call connection failure in a video communication providing a multimedia ring back tone service according to an exemplary embodiment of the present invention.

The method for reducing the risk of a call connection failure in a video communication providing a multimedia ring back tone service according to an exemplary embodiment of the present invention may be performed by a system. The system will be referred to as a video call connection failure reducing system.

Referring to FIG. 3, in operation S310, a calling terminal attempts a call, such as a video call, to a called terminal. In operation S320, the video call connection failure reducing system connects to a call connection video server through an originating switch in order to receive a video ring back. Here, the video ring back is a multimedia RBT, and may include video information and voice/audio information.

In operation S330, the video call connection failure reducing system determines whether a call between the calling terminal and the called terminal is connected.

If the call between the calling terminal and the called terminal is not connected, the video call connection failure reducing system returns to operation 320.

If the call between the calling terminal and the called terminal is connected, the video call connection failure reducing system disconnects from the call connection video server through the originating switch in operation S340. The calling terminal also stops receiving the multimedia RBT.

In operation S350, the video call connection failure reducing system receives a first message from the calling terminal. In this instance, the first message is an H.245 message, and may be a message received while a capability exchange or a level detection is performed, when opening a video call session with the calling terminal after replying to the call connection request.

In this instance, the video call connection failure reducing system may receive a message that was intended to be transmitted to the call connection video server as the first message, when a channel switch from a first channel (between the originating switch and call connection video server) to a second channel (between the originating switch and a called terminal) is performed. Accordingly, the video call connection failure reducing system analyzes the first message. Also, the video call connection failure reducing system determines whether the first message is a message that was intended to be transmitted to the call connection video server or is a message from the originating switch, which is described in greater detail below.

In operation S360, the video call connection failure reducing system analyzes the received first message and determines whether the first message is an erroneously sent message. Specifically, the video call connection failure reducing system determines whether the first message includes predetermined data including at least one of a video temporal spatial tradeoff command, miscellaneous video temporal spatial indication, and video fast update picture command.

If the predetermined data is included in the first message, the video call connection failure reducing system determines whether the first message corresponds to a first received message that is received after the called terminal replies to the call connection request in operation S370.

If the first message corresponds to the first received message, the video call connection failure reducing system sets a second message as the initial value for the NSRP session with the calling terminal. The second message may be an H.245 message received after the first message.

That is, the video call connection failure reducing system may set the second message as a sequence number of an NSRP layer. For this, the video call connection failure reducing system may determine that the first message is a message that was intended to be transmitted to the call connection video server, disregard the first message, and invalidate the sequence number erroneously set based on the first message.

Conversely, if the first message does not include the predetermined data, that is, an appropriate message such as a CESE_REQUEST_MSG or MSDSE_REQUEST_MSG is included in the first message, the video call connection failure reducing system may set the first message as the initial value for the NSRP session with the calling terminal in operation S390. That is, if the first message is a message transmitted from the originating switch as opposed to a message intended to be sent to the call connection video server, the video call connection failure reducing system may set the first message as the sequence number of the NSRP layer.

Also, if the first message does not correspond to the first received message, the video call connection failure reducing system may set the first message as the initial value for the NSRP session with the calling terminal in operation S390. That is, if the first message is the message transmitted from the originating switch as opposed to a message intended to be sent to the call connection video server, the video call connection failure reducing system may set the first message as the sequence number of the NSRP layer.

The above-described exemplary embodiments may be partially or wholly implemented by being recorded in computer-readable media including program instructions to implement various operations by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may include a computer having a processor and an internal memory or a drive configured to receive computer-readable media, and may be configured to act as one or more software modules in order to perform the operations of the above-described exemplary embodiments of the present invention.

According to an exemplary embodiment of the present invention, an H.245 message is received while a capability exchange or a level detection is performed when opening a video call session after replying to a call connection request. If the H.245 message includes an erroneously sent message, the H.245 message may be determined to be a message intended to be transmitted from a calling terminal to a call connection video server, and may be disregarded since negotiation about a capability is not complete. Also, the H.245 message may not be set as an NSRP sequence number, and the called terminal thereby may receive an appropriate H.245 message. Thus, a signaling error detection process is added to an H.245 layer, which is a upper layer of an NSRP layer, and thereby may prevent or reduce a signaling problem that otherwise may not have been detected in the NSRP layer.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for reducing a risk of call connection failure, comprising:
replying to a call connection request from a calling terminal;
receiving a first message;
determining whether the first message includes predetermined data, the predetermined data comprising data to be sent to a call connection video server; and
if the first message includes the predetermined data, setting an initial value using a second message from the calling terminal for a Numbered Simple Retransmission Protocol (NSRP) session with the calling terminal,
wherein the predetermined data includes at least one of a video temporal spatial tradeoff command, miscellaneous video temporal spatial indication, and video fast update picture command.

2. The method of claim 1, further comprising:
determining whether the first message corresponds to a first received message that is received after replying to the call connection request.

3. The method of claim 1, wherein the setting an initial value using the second message comprises:
setting a sequence number of an NSRP layer using an H.245 message, the H.245 message being the second message.

4. The method of claim 1, further comprising:
determining a source of the first message; and
if the first message was to be transmitted to a call connection video server, disregarding the first message and invalidating the initial value.

5. The method of claim 1, wherein if a video call session with the calling terminal is opened after replying to the call connection request, the first message is a message received while a capability exchange or a level detection is performed.

6. The method of claim 1, further comprising:
if the first message does not include the predetermined data or does not correspond to a first received message that is received after replying to the call connection request, setting the initial value for the NSRP session with the calling terminal using the first message.

7. A computer comprising a processor and an internal memory, and adapted to execute a program stored on the internal memory or on a computer-readable recording medium, the program comprising a method for reducing a risk of call connection failure, wherein the method comprises:
replying to a call connection request from a calling terminal;
receiving a first message;
determining whether the first message includes predetermined data, the predetermined data comprising data to be sent to a call connection video server; and
if the first message includes the predetermined data, setting an initial value using a second message from the calling terminal for a Numbered Simple Retransmission Protocol (NSRP) session with the calling terminal,
wherein the predetermined data includes at least one of a video temporal spatial tradeoff command, miscellaneous video temporal spatial indication, and video fast update picture command.

8. A system to reduce a risk of call connection failure, comprising:
a receiving unit to reply to a call connection request from a calling terminal and to receive a first message;
a determination unit to determine whether predetermined data is included in the first message, the predetermined data comprising data to be sent to a call connection video server; and
a setting unit to set an initial value using a second message from the calling terminal for a Numbered Simple Retransmission Protocol (NSRP) session with the calling terminal if the first message includes the predetermined data,
wherein the predetermined data includes at least one of a video temporal spatial tradeoff command, miscellaneous video temporal spatial indication, and video fast update picture command.

9. The system of claim 8, wherein the determining unit determines whether the first message corresponds to a first received message that is received after the receiving unit replies to the call connection request.

10. The system of claim 8, wherein the setting unit sets a sequence number of an NSRP layer using an H.245 message, the H.245 message being the second message.

11. The system of claim 8, wherein the setting unit determines if the first message was to be transmitted to a call connection video server, and if so, the setting unit then disregards the first message and invalidates an initial value erroneously set based on the first message.

12. The system of claim 8, wherein if a video call session with the calling terminal is opened after replying to the call connection request, the first message is a message received while a capability exchange or a level detection is performed.

13. The system of claim 8, wherein if the first message does not include the predetermined data or does not correspond to a first received message that is received after replying to the call connection request, the setting unit sets the initial value for the NSRP session with the calling terminal using the first message.

* * * * *